United States Patent
Galati

(10) Patent No.: US 8,542,145 B2
(45) Date of Patent: Sep. 24, 2013

(54) LOCATING SYSTEM BASED ON NOISY TYPE WAVEFORMS

(75) Inventor: Gaspare Galati, Rome (IT)

(73) Assignee: Universita' Degli Studi di Roma Tor Vergata, Rome (IT)

( * ) Notice: Subject to any disclaimer, the term of this patent is extended or adjusted under 35 U.S.C. 154(b) by 210 days.

(21) Appl. No.: 12/737,664

(22) PCT Filed: Aug. 6, 2009

(86) PCT No.: PCT/IB2009/053442
§ 371 (c)(1),
(2), (4) Date: Feb. 4, 2011

(87) PCT Pub. No.: WO2010/016029
PCT Pub. Date: Feb. 11, 2010

(65) Prior Publication Data
US 2011/0128181 A1 Jun. 2, 2011

(30) Foreign Application Priority Data
Aug. 7, 2008 (IT) .............................. RM2008A0445

(51) Int. Cl.
*G01S 7/38* (2006.01)
*G01S 13/42* (2006.01)

(52) U.S. Cl.
USPC ............. 342/14; 342/107; 342/109; 342/113; 342/146; 342/147; 342/189; 342/108

(58) Field of Classification Search
USPC ............ 342/13–15, 107–109, 113, 146–147, 342/189
See application file for complete search history.

(56) References Cited

U.S. PATENT DOCUMENTS

| 4,078,234 A | * | 3/1978 | Fishbein et al. | 342/110 |
|---|---|---|---|---|
| 4,114,153 A | * | 9/1978 | Neidell | 342/108 |
| 4,388,622 A | * | 6/1983 | Fletcher, Jr. | 342/112 |
| RE31,509 E | * | 1/1984 | Neidell | 342/108 |
| 5,808,580 A | * | 9/1998 | Andrews, Jr. | 342/162 |
| 6,144,694 A | | 11/2000 | Uta et al. | |
| 6,522,295 B2 | | 2/2003 | Baugh et al. | |
| 7,750,841 B2 | * | 7/2010 | Oswald et al. | 342/147 |
| 2003/0071749 A1 | | 4/2003 | Yu | |
| 2008/0088508 A1 | | 4/2008 | Smith | |

(Continued)

FOREIGN PATENT DOCUMENTS

| EP | 0751630 | 1/1997 |
|---|---|---|
| EP | 0893703 | 1/1999 |
| EP | 0940925 | 9/1999 |

*Primary Examiner* — John B Sotomayor
(74) *Attorney, Agent, or Firm* — Hedman & Costigan, P.C.; James V. Costigan; Kathleen A. Costigan

(57) ABSTRACT

The present invention relates to a system for locating non-cooperating objects by means of a random or pseudo-random noisy type waveform generator, an amplifier, of said waveforms and an antenna which radiates them towards the object, which object generates an electromagnetic echo which is detected by a passive subsystem of antennas and receivers. The time delay and Doppler shift values are determined in the latter subsystem and in turn forwarded from encoding and modulating blocks to a central processor which estimates the position and the speed of the object. The passive subsystem receives, through a transmission channel or storage element, the reference signal which represents the transmitted noisy type waveform and uses it for calculating the bi-dimensional cross correlation (ambiguity function), which permits to estimate the time delay and the Doppler shift.

1 Claim, 3 Drawing Sheets

(56) References Cited

U.S. PATENT DOCUMENTS

2008/0158061 A1 7/2008 Greverie et al.
2011/0128181 A1* 6/2011 Galati .......................... 342/107
2011/0273325 A1* 11/2011 Goldman ...................... 342/146

* cited by examiner

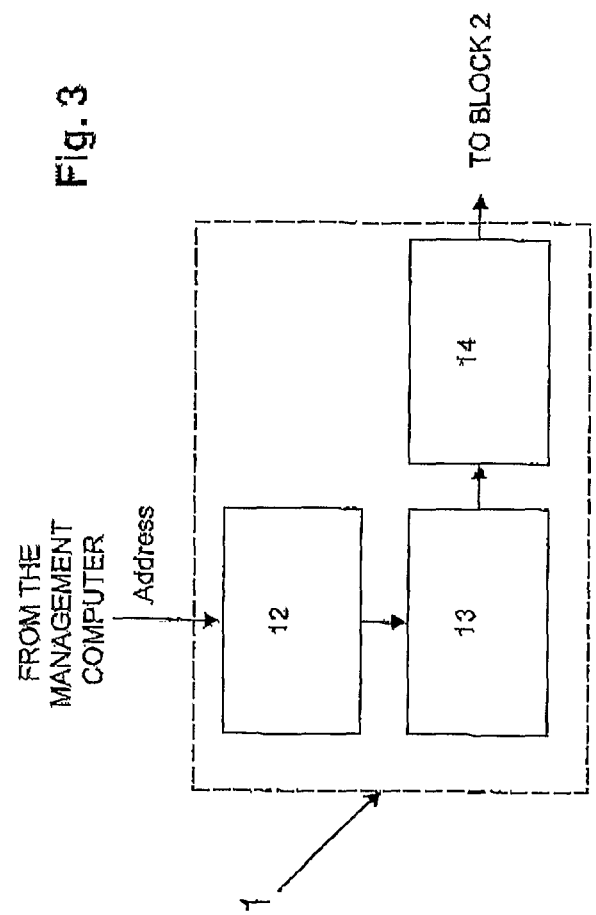

LOCATING SYSTEM BASED ON NOISY TYPE WAVEFORMS

FIELD OF THE INVENTION

The invention is applied in the technical field of locating moving vehicles or objects (based on air, sea, land—the objects hereinafter are also named "targets") for surveillance purposes. The location herein considered is of the non-cooperative type; i.e. it does not require the cooperation of the vehicle intended to be monitored: it is, indeed, based on electromagnetic wave back-scattering, particularly in the microwave region, on the body of the vehicle and on its onboard infrastructures, such as the antenna system (including the radar antenna) which equips many vehicles.

From the two main parameters of the back-scattered electromagnetic signal, detected by one or more antennas, said parameters being the time delay and the frequency shift (Doppler effect), it is possible to obtain the parameters which allow us to reconstruct and estimate the motion of the object, i.e. its position and speed (in two or three dimensions, according to the type of moving vehicle), through techniques that are well-known to surveillance and radio-location experts (and with a possible assistance by other possible parameters, such as direction, intensity and polarization of the back-scattered field). The more accurate these parameters, the greater the signal bandwidth occupancy and the illumination time of the target.

PRIOR ART

Locating aircraft and moving vehicles in general for surveillance purposes is a very old technique; the main system which has been used for over 70 years for detecting and locating objects also at very large distances (hundreds of kilometers) is Radar, which permits to actively detect and locate (in two or three dimensions) air and sea "targets" by illuminating these objects by means of high power electromagnetic signals and by analyzing the return signal (radar echo). Air and sea target location is also possible by using passive techniques, i.e. techniques which do not include illuminating and analyzing the echo signal, but are based on that said targets have radio-emitters onboard for their own communication and surveillance purposes, and the reception of these emissions allows to detect the target and identify its direction and, if the reception is made from several points sufficiently separated in space, its position. The pertaining technique, know as "multilateration", was the object, inter alia, of patent application WO2005111654 and patent application US2005/0035897.

Multistatic radars, in which the transmitter is physically separated from the receivers, are an intermediate situation between classic radar techniques and passive location techniques with geographically distributed receivers. The most recent systems, named "passive radars with illuminators of opportunity", known in the international literature as PCL (i.e. "Passive Coherent Location"), or as PCR ("Passive Covert Radar") systems, essentially consist of multistatic radars which use one or more "transmitters of opportunity", i.e. present in the operative scenario for other purposes, such as frequency modulation (FM) radio broadcasting stations and cellular telephony stations. Disadvantageously, however, the signals emitted by such transmitters has limited power and narrow bandwidth with regard to the location function.

U.S. Pat. No. 7,155,240 suggests a multistatic location system which uses telecommunication signals, the codes of which, recorded offline, are correlated to the echo of the target, while, instead, in a preferred embodiment of the present invention, which uses random signals, the correlation is carried out online and no particular codes are required.

Despite having been recently advertised by commercially very aggressive known suppliers, passive radars with illuminators of opportunity suffer from significant basic limitations which make them little or not at all useful in many applications. With regards to passive radars with illuminators of opportunity, reference may be made, for example, to U.S. Pat. No. 6,522,295, which is based on a reception subsystem capable of receiving both a reference signal from a non-controlled transmitter and the transmissions which are generated by said non-controlled signal being back-scattered by an object.

By comparing passive radars with illuminators of opportunity and U.S. Pat. No. 6,522,295, it is worth noting that the present invention, on the contrary, is based on a controlled transmitter.

The limitations of passive radars with illuminators of opportunity include:

(a) use of non-optimal waveforms for locating, in particular with:
  limited power levels (frequency modulation—FM—radio broadcasting has transmitters of the order of several dozens of watts, with poorly directional antennas; cellular telephony has the same order of effective irradiated power),
  a limited bandwidth (order of dozens, or at the most hundreds of kHz, against dozens or hundreds of MHz which are desirable to obtain a good location accuracy),
  a non-optimal ambiguity function pattern, and consequent a poor quality of delay and Doppler frequency measurements;

(b) due to the nature of the service supplied by the transmitter itself, the emission is directed towards the most populated zones and towards the surface of the Earth, and therefore the coverage of airspace, particularly at high altitudes, in airspaces far from populated areas and in sea zones far from the coast is not ensured;

(c) emission may come less in any time, even in critical instants for surveillance purposes;

(d) although receiving stations may be placed, within certain limits, in an optimal manner, the geometry of the emitting stations is defined by different needs from those of surveillance, thus causing strongly variable performances from point to point in terms of detection and location: accordingly, minimum ensured performances, which are essential in critical applications, such as Air Traffic Control, are not ensured.

On the other hand, both multistatic radars and passive radars with illuminators of opportunity have some advantages in line of principle, which are:
  for passive radars with illuminators of opportunity, eliminating the cost of the transmitter and the possibility of updating target data (position, speed) also at very short time intervals, e.g. every second;
  for both (multistatic radars and passive radars with illuminators of opportunity), the redundancy due to multiple receivers, their difficult location by who wants to either to modify or to destroy them, and the better capacity of detecting Stealth type targets (indeed, the reduction of the radar cross section is often less effective in the bi-static or multistatic case, than it is in the traditional mono-static situation).

The absence of predictability and repeatability for the irradiated waveform is also a feature of a class of "active" radars, named Noise Radars, which emit signals of the random or the pseudo-random type. With this regard, the term "random", as referred to a signal (or waveform), indicates that it is not predictable, and the term "pseudo-random" indicates that it is not predictable by an external observer, although the "internal" generation mechanism of the said signal is known. This distinction, while conceptually important, is not very relevant in operative terms: there are no substantial differences for an external observer. By virtue of the said emitted waveform features, it is very difficult to intercept these radars, and thus locate them and jam their operation. One type of Noise Radar—inter alia—is described in the U.S. Pat. No. 6,271, 786. An operational limitation of Noise Radars, in particular when they operate on a wide band, is that their transmission may interfere with other users.

A radar system which emits pseudo-random waveforms, in particular of the "spread spectrum" class, is described in EP0893703A1: this is a bi-static radar, i.e. with two separate antennas, one transmitting and one receiving; the latter is formed as an array, i.e. with several elements spaced from one another by about half a wavelength, i.e. of the order of centimeters in microwave applications. Thereby, it is possible to create several receiving antenna beams (of the order of hundreds) for non-accurately locating the target.

SUMMARY OF THE INVENTION

The present invention relates to a system of radically new conception and implementation, which allows us to keep the advantages of both multistatic radars and passive radars with illuminators of opportunity, thus eliminating the disadvantages described above under items (a), (b), (c) and (d), and, item at least equally important, limiting the extent of any possible interference with other users of the electromagnetic spectrum without significantly reducing the average radiated power of the system itself and thus without any location performance degradation.

A multistatic radar advantageously includes several receiving antennas (not only one antenna, as in the case of bi-static radars) distributed in the operating environment, thus allowing a much more accurate and, by virtue of the measurement redundancy, more reliable location.

The present invention relates to an integrated system for locating objects, thereinafter also named "targets" (such as aircrafts, ships or other moving or temporarily steady objects) for the purposes of surveillance and/or tracking, based on radio-electric signals: the objects are illuminated by a broadband, noisy type waveform emitted by a controlled generator or emitter. The electromagnetic echo signal produced by the object illuminated by said waveform is received by an appropriate passive antenna and receiver subsystem, appropriately placed in the operating environment, and sent to a processing subsystem in which the concerned object is located by extracting the position data obtained by jointly analyzing the appropriately recorded transmitted signal and the echo caused by the said object.

The present invention thus aims to achieve the above-discussed goals by implementing an integrated multistatic system for locating moving or temporarily steady objects which, in accordance with claim 1, includes:
a controlled generator, able to emit a broadband, noisy type waveform, so as to illuminate said objects;
a passive subsystem, comprising a plurality of antennas distributed in an operating environment and a respective plurality of receivers, each receiver being connected to a respective antenna, said passive subsystem being adapted to receive an electromagnetic echo signal produced by each object illuminated by said waveform;
processing means able to process first data supplied by said receivers so as to locate each object by extracting second data related to position and/or speed of said object,
wherein the receivers of the passive subsystem are able to measure said first data, including time delay and Doppler shift, by calculating a bi-dimensional cross correlation function (i.e. according to time and Doppler frequency) between the electromagnetic echo signal produced by each object and a reference signal consisting of a replica of the waveform transmitted onto the object itself by the generator.

Because, as known in physics and in the radar techniques, the electromagnetic echo of a moving object has a frequency shift due to the Doppler effect (for short, "Doppler shift"), said cross correlation is calculated for the different possible speeds of the object, giving rise to a bi-dimensional function, known in radar techniques as "ambiguity function", of which the mono-dimensional cross correlation is a particular case.

The broadband generator includes a synthesizer of a noisy type waveform, which waveform is random, i.e. entirely unpredictable, as well as a power amplifier fed by said synthesizer and a transmitting antenna, able to receive said waveform from said power amplifier, and capable of emitting in the direction of the object to be located.

A transmission channel for transmitting the reference signal from the said waveform generator to the said passive subsystem is also included.

In a first embodiment, said transmission channel comprises:
a transmitter, connected to the waveform generator, able to amplify and modulate the reference signal,
a first antenna, connected to the transmitter, able to radiate said reference signal,
a second antenna able to receive the reference signal and connected to the passive subsystem so that the latter may use said reference signal for calculating the bi-dimensional of cross correlation function (ambiguity function).

In a second embodiment, said transmission channel comprises a broadband connection on a physical carrier, preferably on optical fiber.

In a third embodiment, the transmitted waveforms are pseudo-random and are generated offline and recorded on a physical medium which is a storage element of appropriate capacity, with the advantage that each waveform does not need to be transmitted in real time by the waveform generator to the passive subsystem, being the waveform itself obtainable by addressing said storage element by means of a management computer for the system object of the present invention.

There are advantageously provided encoding and modulating means, interposed between said receivers and said processing means, able to receive measurements of said first data from each receiver and to appropriately encode and modulate them for transmitting them to said processing means.

The waveform generator is, in one of the possible operational scenarios of the invention, a radar jammer belonging to an electronic countermeasures system for jamming one or more radars aboard the moving object to be located.

A further element of the present invention provides a process for locating moving or temporarily steady objects by means of the aforesaid integrated locating system, which includes the following steps:
emitting a noisy type waveform by means of a broadband controlled generator, so as to illuminate said objects;
receiving an electromagnetic echo signal, produced by each object illuminated by said waveform, by a passive subsystem comprising a plurality of antennas distributed in an operating environment and a respective plurality of receivers, each receiver being connected to a respective antenna;

locating each object by extracting second data, related to position and/or speed of said object, obtained by processing the first data transmitted by said receivers, using processing means, said first data comprising time delay and/or Doppler shift measurements obtained by calculating the bi-dimensional cross correlation function between the electromagnetic echo signal produced by each object and a reference signal consisting of a replica of the waveform transmitted onto the object itself by means of the generator.

The said transmitted waveform has the following features:

it is a broadband waveform (typically with a bandwidth of hundreds of MHz), it is a high power waveform, with EIRP (Effective Isotropically Radiated Power) of the order of 70-80 dBm (decibels over milliwatts), and up to about 90 dBm or even more, it is a noisy type waveform, thus having an ambiguity function which is optimal for locating purposes, with a single peak and negligible side lobes both in time and in frequency, and finally it is controlled by who manages the whole system.

The "Noise Radar" type technique may conveniently be implemented—according to a preferred embodiment of the present invention—by transmitting pseudo-random type waveforms, as defined above, e.g. of the "Spread Spectrum" type. The prior art of the present invention mainly includes such a possibility for "pulse" type radars, i.e. in which the transmitted waveform consists of pulses which are encoded—usually in phase—in a pseudo-random manner. The present invention, instead, uses waveforms of very different type, not pulsed and of any length, with variable phase and amplitude, which are much more effective and adapt well to the wideband solution and/or to the solution in which the transmitting component is separated from the receiving component. Said waveforms may be generated and recorded on storage medium with adequate capacity by virtue of modern, well-known digital techniques. Furthermore, it is possible (and contemplated by the present invention), to optimize the pseudo-random waveforms to be recorded on an appropriate medium for a subsequent transmission, by generating them so as to maximize the ratio between average width and peak width (in order to optimally use the average power which may be generated by the transmitter, and thus the energy sent to the target,) while making sufficiently low the power transmitted in those frequency ranges of the electromagnetic spectrum which may be used by other users, e.g. for radio-communications or satellite navigation purposes.

These features of the present invention allow us to overcome the drawbacks under item (a) of the prior art and to reduce possible interferences detrimental to other users.

The transmission, in the present invention, is directed to the concerned objects (i.e. the targets), thus avoiding the drawbacks under item (b) of the prior art; the transmission is needed for operative purposes, and is managed by the single unit which manages the integrated surveillance system, thus avoiding the drawback under item (c); finally, the position of both the transmitting component and the receiving component, all managed by the single entity which manages the integrated system (and appropriately arranged in the land, sea, air or mixed environment), is optimized, thus avoiding drawback (d).

The higher cost of the transmitter in the system object of the present invention, as compared to passive radars with illuminators of opportunity, is compensated by the very fact that in a currently preferred embodiment said transmitter is part of the electronic countermeasure system, the objective of which is to jam the onboard radar of the moving vehicle or target the accurate location of which is intended to be obtained by means of the present invention. In such an embodiment, high power levels are directed to the target, due to EIRP (Effective Isotropically Radiated Power) values up to the order of magnitude of 80 or 90 dBm (decibels over milliwatts), or higher, according to the class of the jammer, against EIRP values of the order of 40 or 50 dBm of FM radio broadcasting and cellular telephony. The other conditions being equal, the EIRP difference alone implies, for the system object of the present invention, a location accuracy one hundred times better than the prior art. Furthermore, the bandwidth of the noisy waveform emitted by the jammer is at least two orders of magnitude greater than the pass-band of the receiver of the "victim" radar, and in all cases at least equal, and normally higher, than the frequency agility band of the radar itself, which is, in turn, typically at least of the order of one hundred MHz (the extent of the agility band of a typical airborne radar in the X band is up to 1 GHz). Therefore, as compared to the radar systems of the prior art, accuracy is further improved by at least one order of magnitude and by at least two further orders of magnitude as compared to passive radars with illuminators of opportunity.

Finally, it is worth noting that the waveform used in the present invention may be optimized to jam one or more radars, or more simply it may consist of Gaussian noise; in both cases, it is of the type which is non-predictable by an external observer, deserving the appellation of "noisy". Moreover, it has advantageous properties for the purposes of the present invention in terms of its ambiguity function, which takes a pattern similar to the one considered ideal, i.e. with a narrow peak and negligible side lobes.

A further advantage of an embodiment of the invention is the bi-dimensional digital correlation reception, thus with the determination of the ambiguity function (possible also by virtue of the large bandwidths and high dynamics involved), without the complicated, costly coherent systems for generating transmitted signals, typical of the architectures well known to the experts in radar techniques and radar technology, such as the MOPA, Master Oscillator-Power Amplifier architecture. A much higher number of statistically independent samples may be processed with such a reception technique than in traditional techniques based on the matched filter; such a number is limited at the top by the ratio between the speed of light and the speed of the object, and thus may take values of the order of several hundreds of thousands also for fast air targets, with a possible processing gain (improvement of the signal/noise ratio) of up to about 40 dB-50 dB, which is much higher than the 15 dB or 20 dB typical of present non-cooperative surveillance techniques.

Furthermore, in another embodiment of the invention, by overcoming the current technique of using pseudo-random signals of the "Spread Spectrum" type described in EP0893703A1, said waveform may be of the pseudo-random type, with optimized performances in terms of (average width)/(peak width) ratio—and thus an (average power)/(peak power) ratio as high as possible, such as to permit a good transmission efficiency with optimal use of the power transmitter and (in terms of electromagnetic spectrum occupancy) with minimized interference to other users of said spectrum. Indeed, where minimizing interferences to other users of the electromagnetic spectrum is important, a preferred embodiment uses the transmission of pseudo-random signals synthesized so as to have spectrum occupancy lower than that capable of creating interference in predetermined frequency bands to be protected.

The two requirements are contrasting from the design point of view: on one hand, it is desirable to constantly work close to maximum power levels, and thus amplitude levels, by creating a constraint in the time domain in order to best exploit the power which may be generated in transmission, while on the other hand it is desirable to limit the spectrum density which is transmitted in the frequency ranges used by other users, thus creating a constraint in the frequency domain which, as well known, is univocally connected to the time domain by the Fourier transform. An adequate solution to the problem of waveform design is provided by the iterative technique described below.

The pseudo-random signal synthesis process here described by way of a non-limitative example, includes the following steps:

(a) The waveform is firstly computer-generated in the frequency domain by means of its samples (i.e. the coefficients of its discrete Fourier transform), which are taken with Gaussian distribution, and thus obtained by means of a Gaussian pseudo-random variables generator using methods well known to persons skilled in the art;

(b) By operating again in the frequency domain, said waveform is filtered, again by a computer, so as to attenuate the undesired frequency components; for this purpose, it is sufficient to multiply said samples by an appropriate weighting function, with the known frequency weighting technique. It is well known that such a weighting modifies the waveform in time;

(c) Once said weighting has been applied, the transformation is made in the time domain by means of inverse Fourier transform;

(d) An amplitude limitation is applied to the waveform thus obtained to maximize the ratio between average width and peak width. Said amplitude limitation consists in analyzing, one by one, the waveform samples in time and checking whether each of them exceeds a predetermined amplitude threshold value; if this occurs, the amplitude of the concerned sample is set equal to the said threshold value, leaving the phase unchanged, otherwise the sample is not modified (neither in amplitude nor in phase). As well known, amplitude limitation modifies spectral density, making the following step described below necessary;

(e) Spectral analysis (direct Fourier transform) is applied to the waveform resulting from the previous step. The method checks whether the requirement of sufficiently low spectrum density—i.e. under a predetermined value—is met in the frequency ranges of other users of the spectrum. If the result of the spectrum analysis is satisfactory, a waveform to be recorded in the storage element or device is generated; if it is not satisfactory, the waveform undergoes step (b), i.e. it is further filtered, and the generation proceeds according to the sequence seen above, with steps (c), (d) and (e). The final waveform is finally obtained by means of a limited, acceptable number of iterations, made possible by means of an adequate choice of the weighting function of step (b) and of the threshold value of step (d).

As shown above, the iterations end, and the resulting waveform is recorded in a storage element in view of its later use, when the two requirements described above (i.e. a waveform with both an average amplitude close to the maximum level which may be transmitted and a low spectrum density in the frequency ranges used by other users) are met.

The nature of the procedure described above—based on the generation of pseudo-random variables—allows us to obtain a virtually unlimited number of different waveforms in a much broader class than the known "Spread Spectrum" or "Frequency Hopping" waveforms, being those different waveforms fully usable because they meet the requirements indicated above; their actual number is only limited by the storage capacities.

The dependent claims describe preferred embodiments of the invention.

BRIEF DESCRIPTION OF THE DRAWINGS

For a better understanding of the present invention, the preferred embodiments thereof will now be illustrated only by way of a non-limitative example, and with reference to the accompanying drawings, in which:

FIG. 3 shows a preferred embodiment of the generator-synthesizer of the pseudo-random waveforms to be transmitted in a second embodiment of the system of the invention.

DETAILED DESCRIPTION OF PREFERRED EMBODIMENTS OF THE INVENTION

The present invention will be described below with reference to currently preferred embodiments, shown by way of non-limitative example hereinafter.

With reference to the described techniques and principles, it is the object of the present invention an integrated system (see FIG. 1) for locating fixed or moving objects A which are illuminated by a noisy waveform B, i.e. random and not predictable by an external observer, which, in a first embodiment of the invention, is an interference (jammer) intended to either limit or prevent the operation of radars located aboard said objects.

Said waveform is emitted by a high power, broadband generator (in the aforesaid embodiment, such a generator is a radar jammer) in turn comprising a synthesizer 1, a power amplifier 2 and a transmitting antenna 3, preferably of high gain in the direction of the object, which is obtained by mechanically or electronically pointing the antenna beam towards the object itself.

Figure 2:
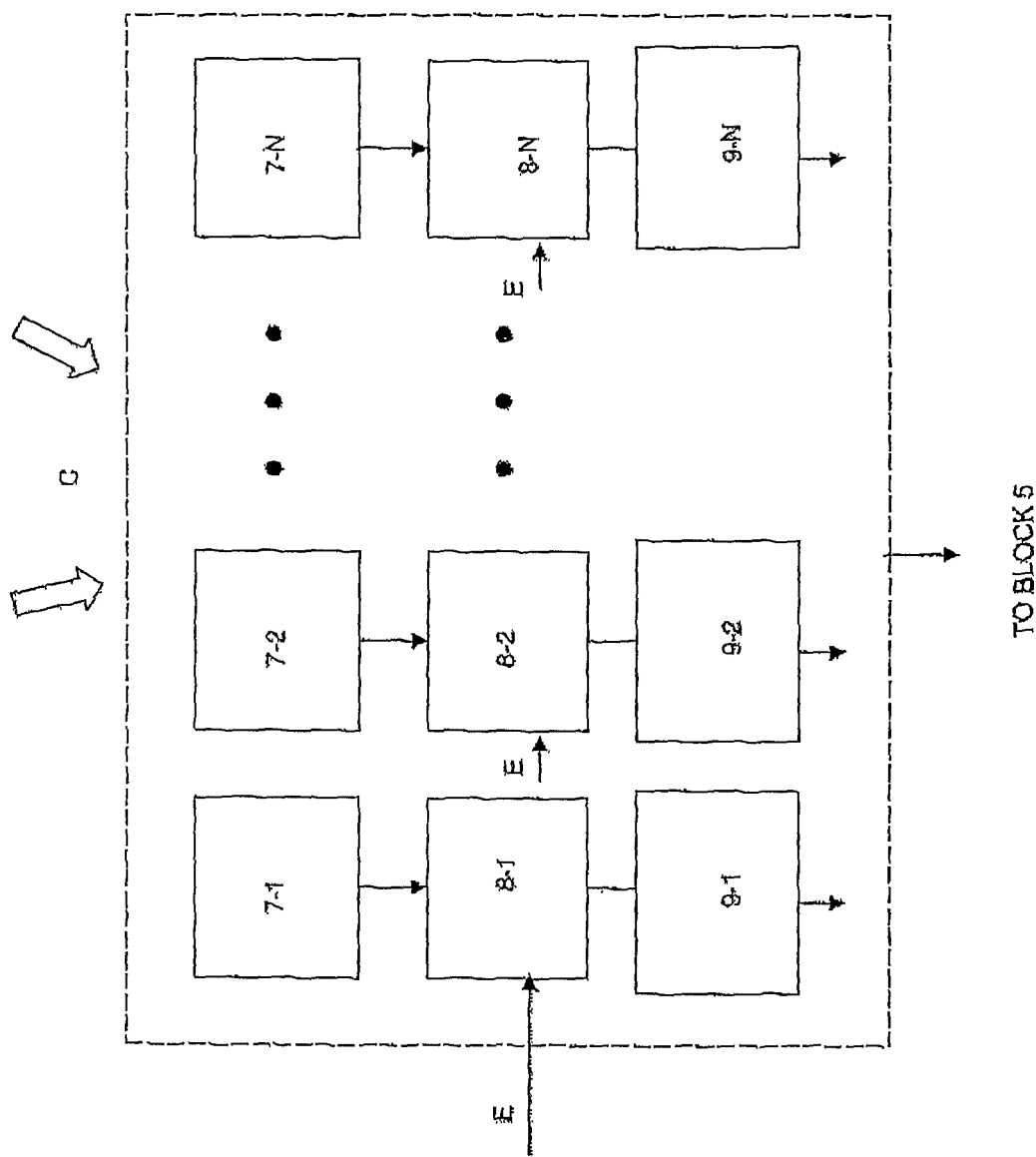
FIG. 2 shows the diagram of the passive antenna and receiver subsystem, part of the present invention, showing the signals exchanged and the connections with the rest of the integrated system.

The electromagnetic echo C, caused by the interaction of the waveform with the structure of the object and with its infrastructures, including the onboard radar antenna if present, is detected by the passive subsystem 4 of antennas and receivers, the preferred embodiment of which is shown in detail in FIG. 2.

In the subsystem 4 itself a record E of the transmitted noisy waveform is received, which carries the entire informative content thereof and which acts as a reference for the correlation reception (used to determine the ambiguity function). As shown in FIG. 2, which shows a detail of block 4, there is a plurality of antenna-receiver sets, which may be deployed either on the territory or, in a maritime context, on one or more ships, and which belong to said passive subsystem 4. The blocks 7-$i$ represent the antennas and the blocks 8-$i$ represent the receivers, with i=1, 2 . . . N. The number N is an appropriate natural number variable from a minimum of one, when complete location is not required and the measurement of the delay and Doppler shift is sufficient, to up to three, when it is desired to reconstruct the three components of the position in space and the entire speed vector, or larger than three when a redundancy is appropriate in order to mitigate the errors and/or improve the accuracy.

In each of the antenna-receiver sets—with techniques, preferably of digital type, well known to persons skilled in the art and implemented in blocks $8\text{-}i$ with $i=1, 2 \ldots N$—the bi-dimensional cross correlation function (sometimes named ambiguity function of the waveform here used) is calculated between the reference signal E and the electromagnetic echo signal C. The double dimension is that of time (relative delay) and frequency (relative frequency shift due to the Doppler effect), the latter due to the relative motion between the object A, the waveform emitting antenna 3 and the receiving antenna $7\text{-}i$, with $i=1, 2 \ldots N$. The peak of the said function depends, as known to all persons skilled in the art, on the position and the speed of the object with respect to the pair of antennas 3 and $7\text{-}i$, with $i=1, 2 \ldots N$; therefore, in the embodiment with multiple antennas and receivers, a plurality of value pairs of time delay and Doppler shift, which is related to the position and to the speed of the object, is generated from said calculation by an appropriate computing element or process, accommodated in the block 4. The blocks $9\text{-}i$, with $i=1, 2 \ldots N$, represent encoding and modulation means which forward said information to block 5, which represents the processing means, by means of data transmission techniques (on a physical carrier or on a radio channel) well known to persons skilled in the art.

Figure 1:
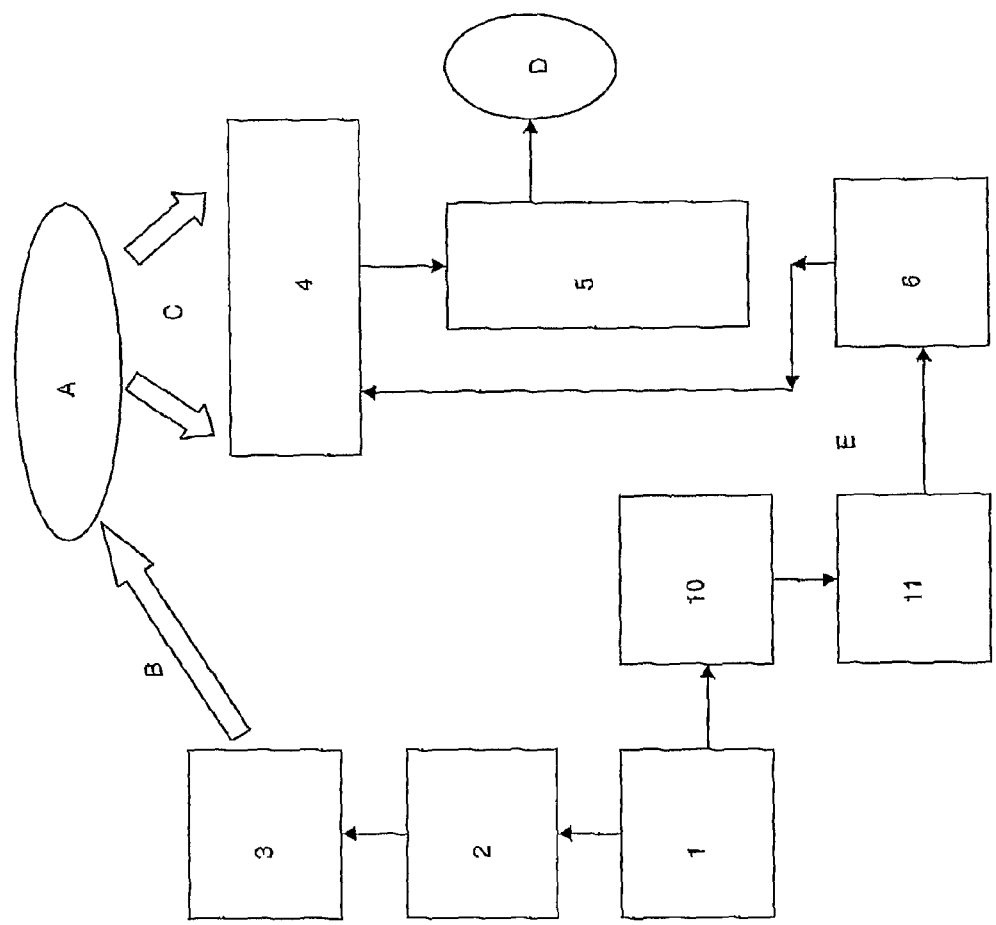
FIG. 1 shows the general diagram of a first embodiment of the integrated radio-electric location system based on noisy waveforms object of the present invention, showing the signals exchanged therein.

The position and the speed of the object may be obtained by means of an appropriate estimation procedure, which conceptually implies searching for the zero of a non-linear function, according to methods well known to persons skilled in the art, e.g. by means of a recursive least square estimate. By way of intuitive explanation, the position information is conceptually obtained by intersecting N ellipsoids, the foci of each of them being the positions of antenna 3 and antenna $7\text{-}i$, respectively, with $i=1, 2 \ldots N$: three ellipsoids are needed if the three-dimensional position of the object is to be determined; but if the object has a known coordinate (e.g. if the altitude is fixed by the object being a boat) then it is sufficient to intersect two ellipses, i.e.—if measurement redundancy is not needed—setting $N=2$ will suffice. The output of each one of the blocks $9\text{-}i$—with $i=1, 2 \ldots N$—in FIG. 2, which is also represented as a total output of the block 4 in FIG. 1, is sent to the block 5, central processor, which is precisely dedicated to running the procedure of estimating the position and the speed of the object, which are the concerned data shown as output D in FIG. 1. For the blocks $8\text{-}i$—with $2 \ldots N$—as a part of block 4 to calculate the bi-dimensional cross correlation, they must have the information related to the newly transmitted waveform.

For this purpose, in the preferred embodiment for moving installations, e.g. naval installations, the reference signal E is amplified and modulated by the transmitter 10 connected to the waveform generator 1, is irradiated by the antenna 11 connected to said transmitter 10, and finally is received by the antenna 6 which, in turn, makes it available to the blocks $8\text{-}i$—with $i=1, 2 \ldots N$—which use said reference for calculating the bi-dimensional cross correlation function (ambiguity function). In other implementations for fixed installations, e.g. land installations, it may be convenient to use fixed transmission means thus keeping the same functions. For example, a broadband connection on physical carrier, preferably optical fiber, may be used for transferring the reference signal E to the passive system 4 of antennas and receivers, which use said reference signal for calculating the bi-dimensional cross correlation function.

In a second embodiment of the system of the invention, it is provided the use of pseudo-random waveforms, and the transmission of the reference signal E to the passive subsystem 4 is replaced by a simply reading of the next waveform to be transmitted by an appropriate storage element or device.

In this second embodiment, instead of by a radar jammer as shown in the first embodiment, the waveform is transmitted by a dedicated functional block, according to a diagram which provides for the replacement of blocks 6, 10 and 11 in FIG. 1 (transmitter 10, antenna 11 and antenna 6) with a direct connection of block 1, defining the synthesizer, to block 4, which defines the passive subsystem comprising the plurality of antenna-receiver sets.

The synthesizer 1, in this second embodiment, comprises in turn the blocks 12, 13 and 14 shown in FIG. 3.

The block 12, named "Waveforms storage" is a storage device, presently implementable by using techniques well known to persons skilled in the art, e.g. magnetic media (hard disks), which, addressed by a system management computer (which system is the object of the present invention), outputs, in real time, the waveform to be transmitted in the next emission cycle. The block 13, defining a "Modulator and frequency converter", allows to convert the waveform to be transmitted into an analog signal translated to the desired carrier frequency, with well known techniques, such as the Hartley digital modulator. From block 13, the signal is sent to block 14, defining a pre-amplifier, which raises the power level thereof, and it is sent to block 2 therefrom, which represents the previously described power amplifier. The rest of the diagram in FIG. 1, comprising the transmitting antenna 3, the object A, the passive subsystem 4 and the processing means 5, also refers to this second embodiment of the invention.

In both embodiments described above, the encoding and modulating blocks $9\text{-}i$—with $i=1, 2 \ldots N$—collect the time delay and Doppler frequency shift measurements which result from the calculation of the bi-dimensional cross correlation function (ambiguity function) done in each receiver $8\text{-}i$ and set the said measurements in an adequate form for transmission and forwarding to block 5. Said bi-dimensional cross correlation is calculated by each of said receivers $8\text{-}i$ connected to the antennas $7\text{-}i$ (with $i=1, 2 \ldots N$, N being a natural number which depends on the application context) of the passive subsystem 4 and thus with the different geometries resulting from the different positions of said antennas.

The time delay and Doppler frequency shift measurements are acquired by block 5 which, acting as a central processor of the system, resolves a set of non-linear equations, the known terms of which are said time delay and Doppler shift measurements provided by block $9\text{-}i$ and the unknown terms of which are the position and speed of the object, thus determining the latter by means of an estimation procedure.

Said position and speed data are thus obtained from the various time delay and Doppler shift measurements which are carried out in the receivers $8\text{-}i$ of the subsystem 4 by calculating the cross correlation function (ambiguity function) between the electromagnetic echo C, caused by the object, and a reference signal E consisting of the replica of the waveform B transmitted onto the object itself.

In the applications in which the speed of the object to be located is either negligible or null, the object is located in the space domain by calculating the mono-dimensional cross correlation, which is a particular case of the bi-dimensional cross correlation which does not include the use of the Doppler frequency.

The invention claimed is:

1. A process for locating moving or temporarily steady objects (A), by means of an integrated multistatic system comprising: a controlled generator able to emit a broadband, noisy type waveform (B); so as to illuminate said objects; a passive subsystem (4), comprising a plurality of antennas (7-$i$) distributed in an operating environment and a respective plurality of receivers (8-$i$), each receiver (8-$i$) being connected to a respective antenna (7-$i$), said passive subsystem (4) being able to receive an electromagnetic echo signal (C) produced by each object (A) illuminated by said waveform; processing means (5) able to process first data supplied by said receivers (8-$i$) so as to locate each object (A) by extracting second data (D) related to position and/or speed of said object (A), wherein the receivers (8-$i$) of the passive subsystem (4) are able to perform measurements of said first data, comprising time delay and Doppler shift measurements, by calculating a bi-dimensional cross correlation function between the electromagnetic echo signal (C) produced by each object (A) and a reference signal (E) consisting of a replica of the waveform (B) transmitted onto the object itself by means of the generator, said method comprising the following steps: emitting a noisy type waveform (B) by means of said broadband controlled generator, so as to illuminate said objects; receiving an electromagnetic echo signal (C), produced by each object (A) invested by said waveform, by said passive subsystem (4); locating each object (A) by extracting second data (D), related to position and/or speed of said object (A), obtained by processing the first data transmitted by said receivers (8-$i$), using processing means (5), said first data comprising time delay and/or Doppler shift measurements obtained by calculating a bi-dimensional cross correlation function between the electromagnetic echo signal (C) produced by each object (A) and a reference signal (E) consisting of a replica of the waveform (B) transmitted onto the object itself by means of the generator, wherein the reference signal (E) is transmitted by the controlled generator able to emit a broadband, noisy type waveform (B) to the passive subsystem (4) by means of a transmission channel and a reference signal (E) is read from a storage device (12) of the synthesizer (1), said synthesizer being directly connected to said passive system (4) and wherein said waveform (B) is of pseudo-random type, not predictable by an external observer, synthesized by the synthesizer (1) so as to have a lower spectrum occupancy than that capable of creating interference in predetermined frequency bands to be protected and an (average power)/(peak power) ratio sufficiently large enough to allow a good transmission efficiency, wherein the synthesis of said waveform (B), which is recorded on said storage device (12), includes the following steps a) generating a waveform in the frequency domain by means of a generator of samples of Gaussian pseudo-random variables, which samples form the spectrum samples of the waveform, b) filtering said waveform so as to attenuate undesired frequency components by applying a frequency-domain weighting function, c) transforming the filtered waveform from the frequency domain to the time-domain, d) limiting the amplitude of said time-domain waveform in by comparing, sample by sample, its amplitude with a predetermined threshold value, e) analyzing the spectrum of the amplitude-limited, filtered waveform and verifying the absence of significant interferences in frequency ranges of other users, and f) recording the amplitude-limited, filtered waveform on the storage device (12) if the result of said spectrum analysis is satisfactory with regards to the absence of said interferences, otherwise repeating steps from b) to f).

* * * * *